(12) United States Patent
Schelling et al.

(10) Patent No.: US 8,679,216 B2
(45) Date of Patent: *Mar. 25, 2014

(54) PROCESS FOR FORMING A LAMINATE OF A NANOWEB AND A SUBSTRATE AND FILTERS USING THE LAMINATE

(75) Inventors: Antoine Schelling, Geneva (CH); Anil Kohli, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 347 days.

This patent is subject to a terminal disclaimer.

(21) Appl. No.: 11/811,249

(22) Filed: Jun. 7, 2007

(65) Prior Publication Data

US 2008/0302242 A1 Dec. 11, 2008

(51) Int. Cl.
*B01D 46/00* (2006.01)

(52) U.S. Cl.
USPC ............... 55/486; 55/487; 55/524; 55/527; 55/528; 55/DIG. 5

(58) Field of Classification Search
USPC ............. 55/524, 527, 528, 486, 487, DIG. 5
See application file for complete search history.

(56) References Cited

U.S. PATENT DOCUMENTS

| | | | |
|---|---|---|---|
| 4,127,706 A | | 11/1978 | Martin et al. |
| 4,983,434 A | | 1/1991 | Sassa |
| 5,632,791 A | | 5/1997 | Oussoren et al. |
| 6,395,046 B1 * | 5/2002 | Emig et al. | 55/382 |
| 6,673,136 B2 * | 1/2004 | Gillingham et al. | 95/273 |
| 6,716,274 B2 * | 4/2004 | Gogins et al. | 95/273 |
| 6,740,142 B2 | 5/2004 | Buetner et al. | |
| 6,743,273 B2 * | 6/2004 | Chung et al. | 55/482 |
| 6,746,517 B2 * | 6/2004 | Benson et al. | 95/273 |
| 6,800,117 B2 * | 10/2004 | Barris et al. | 95/273 |
| 6,872,311 B2 * | 3/2005 | Koslow | 210/502.1 |
| 6,875,256 B2 * | 4/2005 | Gillingham et al. | 95/273 |
| 7,008,465 B2 * | 3/2006 | Graham et al. | 95/78 |
| 7,235,122 B2 * | 6/2007 | Bryner et al. | 95/287 |
| 7,591,883 B2 * | 9/2009 | Kameoka et al. | 95/273 |
| 8,343,250 B2 * | 1/2013 | Schelling et al. | 55/486 |
| 2002/0073849 A1 | 6/2002 | Buettner et al. | |
| 2005/0210844 A1 * | 9/2005 | Kahlbaugh et al. | 55/486 |
| 2006/0137317 A1 * | 6/2006 | Bryner et al. | 55/528 |
| 2006/0137318 A1 * | 6/2006 | Lim et al. | 55/528 |
| 2007/0084786 A1 * | 4/2007 | Smithies | 210/490 |
| 2007/0163217 A1 * | 7/2007 | Frey et al. | 55/482 |
| 2008/0060328 A1 * | 3/2008 | Devine | 55/486 |
| 2008/0134652 A1 * | 6/2008 | Lim et al. | 55/486 |
| 2008/0314011 A1 * | 12/2008 | Smithies et al. | 55/521 |
| 2009/0044702 A1 * | 2/2009 | Adamek et al. | 95/287 |

FOREIGN PATENT DOCUMENTS

| | | |
|---|---|---|
| WO | WO 03/080905 A1 | 10/2003 |
| WO | WO 2005/103355 A1 | 11/2005 |
| WO | WO 2006/053295 A1 | 5/2006 |
| WO | WO 2008/057397 | 5/2008 |
| WO | PCT US2008/007134 | 6/2008 |

OTHER PUBLICATIONS

Filtration Properties of Electrospun Ultrafine Fiber Webs Korean J. Chem.Eng.,22(1),165-172(2005).
Development of High Efficiency Nanofilters Made of Nanofibers Elsevier.
VDI 3926 Oct. 2004.

* cited by examiner

*Primary Examiner* — Robert Clemente

(57) ABSTRACT

A process for forming a laminate of a low basis weight nanoweb and a substrate includes forming a nanoweb on the surface of a collection scrim, and subsequently bringing the nanoweb into contact with a substrate coated with adhesive. The laminate is suitable for use as a gas filtration medium.

10 Claims, No Drawings

PROCESS FOR FORMING A LAMINATE OF A NANOWEB AND A SUBSTRATE AND FILTERS USING THE LAMINATE

BACKGROUND OF THE INVENTION

1. Field of the Invention

The present invention relates to a process for laminating a nanofiber web to a substrate, and to filters and laminates useful in filters for removing solids from fluid streams, as, for example, in industrial gas streams.

2. Discussion of Related Art

Dust collector or bag house type gas filtration is generally used to filter particulate material from industrial effluent or "off-gas," as well as to collect fine product in particulate or powder form. A bag house structure generally includes one or more banks of flexible filter elements, commonly in the form of filter bags, supported within the structure. Filter bags have a generally sleeve-like tubular configuration, with gas flow through the bag house directed so as to deposit the particulate material being filtered during operation of the bag house on the exterior of the sleeve. Each filter bag is secured and maintained in a position such that gas can efficiently passes through the bag thereby removing entrained particulates. U.S. Pat. No. 4,983,434, hereby incorporated by reference, exemplifies a bag house filter structure and a filter for use therein. Dust collectors may also utilize filter elements in the form of cartridges having a generally tubular configuration (round or nonround) typically including pleated filter media. U.S. Pat. No. 5,632,791, hereby incorporated by reference, exemplifies a cartridge filter element.

During operation of the "bag house," used herein to refer both to structures utilizing bags and structures utilizing cartridges, the filter elements (including bags and cartridges, herein referred to interchangeably as "elements" or "bags") must be periodically cleaned when the pressure drop through the bag caused by accumulation of particulate becomes significant. One mode of cleaning bag house filters, referred to as "pulse jet" or "reverse pulse" cleaning is by subjecting the bags to a short burst of reverse-flow air that enters the interior of the filter bags and dislodges the filtered particulate material from the exterior of the bags for collection in the lower portion of the bag house. As the cleaning air passes through the tube venturi, it aspirates secondary air and the resulting air mass violently expands the bag and casts off the collected particulate matter (the "dust cake"). The bag will typically snap back to the cage support and the cleaned filter continues collecting particulate. Pulse jet is the most stressful type of cleaning on the bag house filter media itself, among both bag and cartridge type filters. When a laminate material is used as the media in a pulse jet type filter, the stress on the media caused by repeated expanding and retracting causes multilayered filter media to delaminate.

U.S. Pat. No. 6,740,142 discloses bag house filter media formed from a substrate at least partially covered by a layer of fine fibers having a diameter of between about 0.01 and about 0.5 micron, the fine fiber layer having a basis weight of 0.005 to 2.0 grams per square meter (gsm) and a thickness of 0.1 to 3 microns. To produce the filter media, it is disclosed in U.S. Pat. No. 6,740,142 that a web of nanofibers can be formed directly on the surface of the substrate.

The present invention is directed to a process for forming laminated filter media, and the laminated filter media made thereby. The resulting filter media are have improved resistance to delamination during use with reverse pulse cleaning, are highly efficient, easily cleaned, have the requisite strength characteristics and are economical to produce.

BRIEF SUMMARY OF THE INVENTION

In a first embodiment, the present invention is directed to a process for forming a composite sheet comprising a substrate adhesively laminated to a nanoweb, the process comprising providing a carrier layer having a collection surface, forming a nanoweb on the collection surface of the carrier layer, providing a flexible porous substrate having two major surfaces, applying a layer of adhesive to at least a portion of one surface of the substrate, contacting the adhesive layer with the nanoweb and bonding the nanoweb to the substrate, and optionally removing the carrier layer, thus forming the composite sheet.

In another embodiment, the present invention is directed to a filter element for separating particulate matter from a gas stream comprising a filter medium comprising a substrate having two major surfaces wherein the substrate is adhesively laminated over one of the major surfaces to a first nanoweb having a basis weight less than about 2 gsm.

In another embodiment, the present invention is directed to a filter element for separating particular matter from a gas stream comprising a filter medium comprising exactly one substrate having two major surfaces wherein the substrate is adhesively laminated to a first nanoweb over one of the major surfaces in a face-to-face relationship having a basis weight less than about 2 gsm.

DETAILED DESCRIPTION OF THE INVENTION

The term "nanofiber" as used herein refers to fibers having a number average diameter or cross-section less than about 1000 nm, even less than about 800 nm, even between about 50 nm and 500 nm, and even between about 100 and 400 nm. The term diameter as used herein includes the greatest cross-section of non-round shapes.

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials.

The term "nanoweb" as used herein refers to a nonwoven web that comprises nanofibers.

"Carrier layer" and "scrim" are used herein to refer to any planar structure with which the nanoweb can be bonded, adhered or laminated. Advantageously, the carrier layers or scrims useful in the present invention are spunbond nonwoven layers, but can be made from carded webs of nonwoven fibers and the like, as well as other nonwoven and woven fabrics and release paper.

The process of the invention is useful to adhesively laminate a low basis weight nanoweb to a substrate. Until the present invention, a method of forming a composite of a substrate and a nanoweb having a basis weight less than about 2 gsm has not been known. Nanowebs having such low basis weights are easily damaged during handling. We have found that merely electrospinning a low basis weight nanoweb onto a substrate results in a composite fabric that lacks the required durability to perform as a filter for particulates and delaminates easily.

According to the invention, a low basis weight nanoweb is first formed directly onto a carrier layer or scrim; then a layer of an adhesive is applied in a discontinuous manner to at least a portion of one of the major surfaces of a separate substrate using an applicator roll. The applicator roll has a pattern of raised portions so that the adhesive is not applied in a continuous film. For example, a gravure type roll with raised points is suitable for applying the adhesive in a discontinuous manner.

The scrim/nanoweb composite structure is subsequently brought into contact with the substrate, with the nanoweb and the adhesive-coated surface of the substrate in a face-to-face relationship. Subsequently, a nip formed by two rolls, or another means of contacting the nanoweb and the adhesive-coated substrate, is used to bring the nanoweb surface into contact with the substrate, with the nanoweb touching the adhesive-coated surface. The nip rolls may be in contact with each other, or there may be a fixed or variable gap between the roll surfaces. Advantageously, the nip is formed between a soft roll and a hard roll.

The adhesive can be a melt adhesive or a solvent-based adhesive. If a melt adhesive is used, the adhesive is applied and the nanoweb is brought into contact with the substrate at temperatures above the softening or melting temperature of the adhesive. If a solvent-based adhesive is used, the adhesive lamination process can occur at room temperature. Alternatively, if the filter is intended for high-temperature gas filtration, the adhesive can be a high temperature binding agent. The high temperature binding agent can be in the form of a dispersion. Those skilled in the art will readily recognize suitable adhesives that can be used in the process of the invention are not particularly limited. Examples of suitable adhesives include polyurethane, ethylene vinyl acetate, copolymers of polyester, polyolefins, polyamides, styrene copolymer, chloroprene, acrylic, polyimide, polytetrafluoroethylene, polyetherimides and polyphenylene sulfide.

If desired, upon formation, the scrim/nanoweb/adhesive/substrate composite structure can be rolled up and stored or transported. The composite structure can later be unrolled and the scrim removed, leaving the laminate of the low basis weight nanoweb on the substrate. In some cases, it may be desirable to leave the scrim in place in order to protect the nanoweb layer during handling and use.

The adhesive securely attaches the nanoweb to the substrate and provides the resulting laminate with a high level of durability and delamination resistance. The resulting laminate withstands a high number of cycles of air jet pulsing. For instance, the substrate and nanoweb remain bonded after the laminate has been subjected to VDI 3926 for at least 30 cycles, and more preferably for at least a complete test according to VDI 3926.

The nanoweb comprises primarily or exclusively nanofibers, advantageously produced by electrospinning, such as classical electrospinning or electroblowing, and in certain circumstances, by meltblowing or other such suitable processes including melt film fibrillation. Classical electrospinning is a technique illustrated in U.S. Pat. No. 4,127,706, incorporated herein in its entirety. The electroblowing process is disclosed in World Patent Publication No. WO 03/080905 and is incorporated herein by reference in its entirety. The melt film fibrillation process is disclosed in World Patent Publication Number WO 2005/103355 and is incorporated herein by reference in its entirety.

Polymer materials that can be used in forming the nanowebs of the invention are not particularly limited and include both addition polymer and condensation polymer materials such as, polyacetal, polyamide, polyester, polyolefins, cellulose ether and ester, polyalkylene sulfide, polyarylene oxide, polysulfone, modified polysulfone polymers, polyamideimide, polyimides, and mixtures thereof. Preferred materials that fall within these generic classes include, poly (vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms, polyamideimide, and polyimide. Preferred addition polymers tend to be glassy (a $T_g$ greater than room temperature). This is the case for polyvinylchloride and polymethylmethacrylate, polystyrene polymer compositions or alloys or low in crystallinity for polyvinylidene fluoride and polyvinylalcohol materials. One preferred class of polyamide condensation polymers are nylon materials, such as nylon-6, nylon-6, 6, nylon 6, 6-6, 10, and the like. When the polymer nanowebs of the invention are formed by meltblowing, any thermoplastic polymer capable of being meltblown into nanofibers can be used, including polyolefins, such as polyethylene, polypropylene and polybutylene, polyesters such as poly(ethylene terephthalate) and polyamides, such as the nylon polymers listed above.

Examples of suitable substrates for use in the invention include various nonwoven fabrics, woven fabrics, knitted fabrics, felts, paper, and the like. Suitable nonwovens can include meltblown fibers, spunbond fibers, spunlaced, dry-laid or wet-laid fibers, cellulose fibers, melt blown fibers, or blends thereof. The substrate can be formed from a variety of conventional fibers including cellulosic fibers such as cotton, hemp or other natural fibers, inorganic fibers including glass fibers, carbon fibers, or organic fibers formed from polymers such as polyester, nylon, polyolefins, or other conventional fibers or polymeric materials and mixtures thereof. Fibers are typically used that exhibit excellent resilience and resistance to the effects of the passage of air and the entrapment of particulates. The fabrics should have stability with respect to chemical particulates entrained in the air to be filtered and the temperature of both the air stream to be filtered and the temperature of the particulate captured by the medium. The variety of substrates useful in the invention provides flexibility in designing filter media customized to meet a wide variety of particular filtration needs.

Another object of the invention is to provide a high-efficiency filter medium for filter elements useful in bag house and cartridge type dust collectors, and to provide a filter element comprising the filter medium. The filter medium includes at least one low basis weight nanoweb adhesively laminated to a substrate in a durable, mechanically stable composite structure. The laminate provides excellent filter efficiency at minimum flow restriction when a fluid such as a gas passes through the filter medium. The substrate can be positioned in the fluid stream upstream, downstream or in an internal layer.

The filter medium includes a first nanoweb of basis weight less than 2 gsm, even between about 0.7 gsm and about 2 gsm. The medium further comprises a substrate to which the first nanoweb is adhesively laminated in a face to face relationship.

The filter elements of the invention can be maintained in a useful open shape by supporting the filter medium on a suitable support structure located in the interior of the filter element or by use of a retainer at the neck of the filter element. Such support structures can be in the form of a wound wire or cage-like structure. Alternatively, the support structure can be a perforated ceramic or metal structure that mimics the shape of the filter element. If the support structure contacts the filter medium over a significant fraction of its surface area, the support structure should be permeable to the passage of air through the structure and should provide no incremental increase in pressure drop over the filter element. Such support structures can be formed such that they contact the entirety of the interior of the filter element and maintain the element in an optimal shape.

The filter of the invention can be used in a variety of filtration applications including pulse cleaned and non-pulse cleaned filters for dust collection, gas turbines and engine air intake or induction systems; gas turbine intake or induction systems, heavy duty engine intake or induction systems, light vehicle engine intake or induction systems; Zee filter; vehicle cabin air; off road vehicle cabin air, disk drive air, photocopier-toner removal; HVAC filters in both commercial or residential filtration applications.

EXAMPLES

In the non-limiting examples that follow, the following test methods were employed to determine various reported characteristics and properties. ASTM refers to the American Society of Testing Materials. ISO refers to the International Standards Organization. TAPPI refers to Technical Association of Pulp and Paper Industry.

Filtration Efficiency, Pressure Drop and Cycle Time were measured according VDI 3926, the text of which is hereby incorporated herein by reference.

In VDI 3926, filtration efficiency (also called dust leakage) is measured in micrograms per cubic meter ($\mu g \cdot m^{-3}$), pressure drop is measured in Pascal (Pa) and cycle time is measured in seconds. Filtration efficiency represents the amount of dust passing through the filter. The pressure drop is the differential pressure between the 2 faces of the filters. The cycle time is the duration between 2 pulses to release the dust cake. When a certain pressure drop is obtained (in VDI 3926 the maximum pressure drop is set at 1000 Pa) a reverse flow pulse is automatically created. The VDI 3926 is based on an initial 30 cycles, followed by 10,000 cycles to simulate filter aging, and finally another 30 cycles. The filtration efficiency, pressure drop and cycle time are measured at the end of the final 30 cycles.

A good filter will have a low filtration efficiency number (corresponding to low leakage), low pressure drop and long cycle times. Low pressure drop will correspond to energy savings for the end user as lower pressure is required to force the gas through the filter. Long cycle time will correspond to a longer filter life. In actual use, a cycle time of less than 30 seconds indicates the filter medium must be replaced.

Air Permeability was measured according to ISO 9237, and reported in units of l/dm²/min.

Examples 1-3

Nanoweb samples were produced by electroblowing nylon 6, 6 nanofibers directly onto a polyester nonwoven scrim using the process of PCT International Publication No. WO 03/080905. The fibers of the nanoweb had a mean fiber diameter of about 400 nm. The nanowebs had a basis weight of 1.7 gsm.

The nanowebs were bonded to samples of 14 oz/yd² polyester felt by adhesive lamination as follows. A discontinuous layer of polyurethane adhesive was applied to one surface of the felt using a gravure roll. The felt and the nanoweb/scrim were fed into a nip of two rolls with the adhesive-coated surface of the felt contacting the nanoweb side of the nanoweb/scrim. The nip pressures used to form the laminate of Examples 1-3 were 40 psi, 60 psi and 80 psi, respectively. The scrim was removed from the laminate of Example 1 prior to testing. The scrim was left in place in the laminates of Example 2 and 3.

Comparative Example 1

A filter medium sample was made according to the instructions set forth in U.S. Pat. No. 6,740,142. A nylon 6, 6 nanoweb having a basis weight of 2 gsm was spun using the process of World Patent Publication No. WO 03/080905. The nanoweb was spun directly onto a 14 oz/yd² polyester felt substrate. The mean fiber diameter was about 400 nm. The melting temperature of the nylon 6, 6 nanoweb was 227° C. as determined by thermogravimetric analysis. Samples were made using about 100 different combinations of process temperatures, consolidation pressures and residence times. According to U.S. Pat. No. 6,740,142, temperatures were selected near the melting temperature of the nylon 6, 6 nanoweb. Temperatures ranged between 220° C. and 235° C.; consolidation pressures ranged between 20 bars and 30 bars; residence times ranged between 30 seconds and 70 seconds. The sample which appeared to have the strongest adhesion of the nanoweb to the substrate was selected, based on manually rubbing the nanoweb on the surface of the substrate. The sample was made by consolidating the sample at 227° C. in a press at a residence time of 60 seconds under 30 bars of pressure.

Both before and after consolidation, the sample exhibited poor adhesion of the nanoweb to the felt, and the nanoweb could be separated from the felt by light abrasion on the nanoweb surface with a thumb. The sample was subjected to VDI 3926 testing and survived less than 30 cycles before delaminating.

Table 1 includes the air permeability, filtration efficiency, pressure drop and cycle times for Examples 1-3 and Comparative Example 1. The filtration efficiency, pressure drop and cycle time data were not available for Comparative Example 1 because the sample delaminated within the first 30 cycles of testing. It can be seen from Table 1 that the media of Examples 1-3 offer excellent delamination resistance. The filter media of Examples 1-3 also have been found to have high filtration efficiency at low pressure drops.

TABLE 1

|  | Total basis weight (gsm) | Nanoweb basis weight (gsm) | Air permeability (l/dm²/min) | Filtration efficiency ($\mu g/m^3$) | Pressure drop (Pa) | Cycle time (sec) |
| --- | --- | --- | --- | --- | --- | --- |
| Example 1 | 531 | 1.7 | 98 | 17.6 | 194 | 361 |
| Example 2 | 533 | 1.7 | 96 | 18.5 | 217 | 347 |
| Example 3 | 515 | 1.7 | 101 | 15.1 | 170 | 432 |
| Comparative Ex. 1 | 466 | 2 | 143 | No data (delaminated) | No data (delaminated) | No data (delaminated) |

What is claimed is:

1. A filter element for separating particulate matter from a gas stream comprising a filter medium comprising a porous substrate having two major surfaces wherein the substrate is adhesively bonded over one of the major surfaces to a first nanoweb having a basis weight less than about 2 gsm by a layer of adhesive and wherein the filter medium is made by a process comprising the steps of
   (a) forming a nanoweb directly onto a carrier layer;
   (b) providing a porous substrate having two major surfaces;
   (c) applying a layer of adhesive to at least a portion of one surface of the porous substrate while it is not in contact with the nanoweb;
   (d) contacting the adhesive layer with the nanoweb and bonding the nanoweb to the porous substrate wherein the adhesive layer securely attaches the nanoweb to the substrate; and
   (e) optionally removing the carrier layer, thus forming the filter medium; and wherein the substrate and the first nanoweb remain bonded after the filter element has been subjected to a complete test according to VDI 3926.

2. A filter element for separating particular matter from a gas stream comprising a filter medium comprising exactly one porous substrate having two major surfaces wherein the substrate is adhesively bonded over one of the major surfaces in a face-to-face relationship to a first nanoweb having a basis weight less than about 2 gsm by a layer of adhesive and wherein the filter medium is made by a process comprising the steps of
   (a) forming a nanoweb directly onto a carrier layer;
   (b) providing a porous substrate having two major surfaces;
   (c) applying a layer of solvent based or melt adhesive to at least a portion of one surface of the substrate while it is not in contact with the nanoweb;
   (d) contacting the adhesive layer with the nanoweb and bonding the nanoweb to the substrate wherein the adhesive layer securely attaches the nanoweb to the substrate; and
   (e) optionally removing the carrier layer, thus forming the filter medium; and wherein the substrate and the first nanoweb remain bonded after the filter element has been subjected to a complete test according to VDI 3926.

3. The filter element of claim 1 or 2 wherein the substrate is selected from the group consisting of spunbond nonwovens, spunlaced nonwovens, airlaid nonwovens, carded nonwovens, felts, spunbond-meltblown-spunbond composite nonwovens, and woven fabrics.

4. The filter element of claim 2 wherein the first nanoweb and the substrate are bonded by means of a solvent-based adhesive, a melt adhesive or a high temperature binding agent.

5. The filter element of claim 1 or 2 wherein the first nanoweb has a basis weight of between about 0.7 gsm and about 2 gsm.

6. A process for removing particulate matter from a gas stream, comprising passing the particle-laden gas stream through the filter medium of the filter element of claim 1 or 2 such that the gas stream enters the filter medium on the surface of the filter medium having the first nanoweb bonded thereto in a face to face relationship and the filtered gas stream exits the filter medium from the surface of the filter medium opposite the first nanoweb.

7. The filter element of claim 1 wherein the first nanoweb and substrate are bonded by a layer of adhesive applied to at least a portion of the substrate.

8. The filter element of claim 2 wherein the first nanoweb and substrate are bonded by a layer of adhesive applied to at least a portion of the substrate.

9. The filter element of claim 1 or 2 wherein the nanoweb is formed by electrospinning or electroblowing.

10. The filter element of claim 1 or 2 wherein the nanoweb is formed by electroblowing and the substrate is selected from the group consisting of spunlaced nonwovens and felts.

* * * * *